B. F. ROBERTSON.
Hand Seeder.

No. 65,278.

Patented May 28, 1867.

Witnesses:
Chas. U. Boyle
J. W. Randolph

Inventor:
B. F. Robertson
By his attorney
M. Randolph & C

United States Patent Office.

BENJAMIN F. ROBERTSON, OF CAP AU GRIS, MISSOURI.

Letters Patent No. 65,278, dated May 28, 1867.

IMPROVEMENT IN CORN-PLANTERS.

*The Schedule referred to in these Letters Patent and making part of the same.*

TO ALL WHOM IT MAY CONCERN:

Be it known that I, B. F. ROBERTSON, of Cap au Gris, in the county of Lincoln, and State of Missouri, have invented a new and useful Improvement in Corn-Planters; and I do hereby declare that the following is a full and clear description thereof, reference being had to the accompanying drawings, and to the letters of reference marked thereon.

Figure 1, of the accompanying drawings, is a transverse vertical section of the "corn-planter," bisecting it.

The main feature of this invention consists in dividing the opening between the side pieces into two parts by the introduction of a partition which is fastened to one of the side pieces and works easily through a slot in the other side piece. The object of this partition is to divide the seeds as they drop from the hopper into two parcels, and thus scatter and divide them.

To enable those skilled in the art to make and use my improved planter, I will proceed to describe its construction and operation.

The side pieces A and A', provided with the handles $a$ and $a^1$ near their upper ends, and with the metallic shoes $a^2$ and $a^3$ at their lower ends, and the seed-hopper B attached to the piece A' near the middle part of it, and the seed-slide C, which is fastened to the side piece A by means of the pin $c$, and enters the lower part of the hopper B, and draws the seeds to be planted therefrom into the opening between the side pieces A and A', are so entirely similar in construction and operation to the similar parts in corn-planters already patented and now in use, that no particular description of them will be here attempted.

Figure 1:
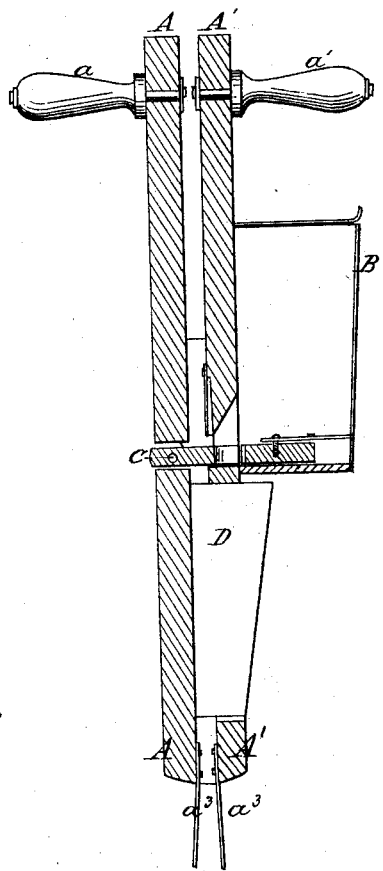
Figure 2:
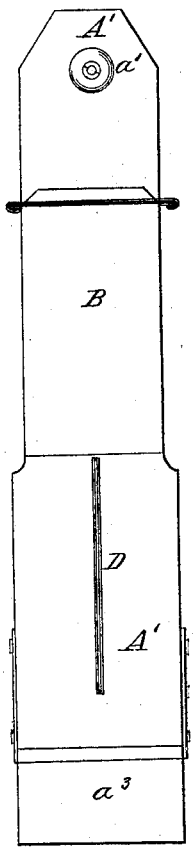
Figure 2 is a front elevation of the "planter."
Figure 3:
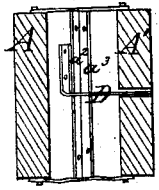
Figure 3 is a horizontal section of it, taken on the line $a-b$ in figs. 1 and 3.

The difficulty experienced in using planters of the above description has been mostly in their inability to scatter the seed, and it is to overcome this difficulty that the present improvements are designed. The tendency of a person using the planter is to hold it more or less leaning to one side at the top, and consequently the seeds would all fall vertically down to one or the other of the corners $x$, as shown in fig. 2. To obviate this difficulty I introduce a thin partition, D, usually of sheet metal, fastened to the side piece A, and working through a slot in the side piece A' as the two pieces are opened or closed. This partition will extend upward to near the seed-slide C, and downward nearly to the shoe-pieces $a^2$ and $a^3$, and will separate the seeds into two parcels, and thus scatter and divide them.

Having described my invention, what I claim is—

The employment of the partition D for the purpose of dividing and scattering the seed, substantially as described and set forth.

BENJ. F. ROBERTSON.

Witnesses:
M. RANDOLPH,
CHAS. U. BOYLE.